United States Patent
Schneider et al.

(10) Patent No.: US 6,559,858 B1
(45) Date of Patent: May 6, 2003

(54) METHOD FOR ANTI-ALIASING OF ELECTRONIC INK

(75) Inventors: Bengt-Olaf Schneider, Yorktown Heights, NY (US); Yi-Min Chee, Sleepy Hollow, NY (US)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 09/580,127

(22) Filed: May 30, 2000

(51) Int. Cl.[7] .................................................. G09G 5/36
(52) U.S. Cl. ........................ 345/611; 345/613; 345/173
(58) Field of Search ................................. 345/611, 613, 345/614, 617, 173

(56) References Cited

U.S. PATENT DOCUMENTS 6,201,528 B1 * 3/2001 Lucas et al. ................ 345/611

* cited by examiner

Primary Examiner—Matthew Luu
(74) Attorney, Agent, or Firm—Paul J. Otterstedt; Harrington & Smith, LLP

(57) ABSTRACT

A procedure is embodied as program code on a medium that is readable by a computer. The program code is used to direct operation of the computer to render lines corresponding to samples, from a digitizer tablet, that map onto a same pixel of a display screen. The program code includes a code segment for subdividing a display screen pixel into a plurality of sub-pixels; a code segment, responsive to each sample that maps onto a current pixel, for mapping the sample onto a sub-pixel center; a code segment for computing a bounding box that is centered on the sample; a code segment, responsive to a size and position of the bounding box, for determining those pixels in a neighborhood of the current pixel that are overlapped by the bounding box; and a code segment for varying an intensity of the overlapped pixels according to the amount of overlap. The code segment that determines pixels in a neighborhood of the current pixel preferably operates to store overlap-related information, for all of the samples that map onto the current pixel, within an auxiliary array. The code segment that varies the intensity then uses the contents of the auxiliary array to vary the intensity of corresponding pixel locations in a frame buffer that has an output coupled to the display screen. The code segment that varies the intensity is responsive to a sub-pixel location of the sample, and to a precomputed summed area table (SAT), for determining an amount by which to vary the intensity.

14 Claims, 3 Drawing Sheets

METHOD FOR ANTI-ALIASING OF ELECTRONIC INK

FIELD OF THE INVENTION

This invention relates generally to electronic writing devices and, more particularly, relates to digitizer devices and the like wherein a user moves a special pen or stylus over a surface of a sensitive tablet for creating strokes of "electronic ink" on a display device.

BACKGROUND OF THE INVENTION

Electronic tablets and digitizer devices are well known and widely used. Typically a user holds a writing implement, such as a pen or stylus that contains electronic circuitry, and then moves a tip of the pen over a surface of an electronic tablet. An output of the tablet, which may be considered to be samples of the pen motion, is indicative of the location, in x-y tablet coordinates, of the tip of the pen. A display device can be used to map digitizer samples to display screen pixel coordinates, and to then connect these pixels by straight line segments.

However, such renderings lack sufficient visual quality. First, the line width can be undesirably thin or "skinny". Second, the lines can appear jagged, as the sample locations are typically rounded to integer pixel locations, and a sample's position within a pixel is not accounted for.

It is also known to use higher order curves that interpolate the samples, however, in practice this technique provides little additional accuracy, and furthermore incurs a significantly higher computational cost than when using the straight line segments.

In either case, the end result is an unsatisfactory, unnatural rendering of the user's handwriting input.

OBJECTS AND ADVANTAGES OF THE INVENTION

It is a first object and advantage of this invention to provide an improved method for rendering the output of a digitizer-type device.

It is a further object and advantage of the invention to render the handwriting lines with a certain width, as well as to reflect the true combination that each digitizer sample makes to a display pixel.

SUMMARY OF THE INVENTION

The foregoing and other problems are overcome and the objects of the invention are realized by methods and apparatus in accordance with embodiments of this invention.

The teachings of this invention are directed to a method for creating anti-aliased images for digitizer tablet samples that map onto the same display screen pixel.

A procedure in accordance with these teachings may be embodied as program code on a medium that is readable by a computer. The program code is used to direct operation of the computer to render lines corresponding to samples, from a digitizer tablet, that map onto a same pixel of a display screen. The program code includes a code segment for subdividing a display screen pixel into a plurality of sub-pixels; a code segment, responsive to each sample that maps onto the same display screen pixel, for mapping the sample onto a sub-pixel center; a code segment for computing a bounding box that is centered on the sample; a code segment, responsive to a size and position of the bounding box, for determining those pixels in a neighborhood of the current pixel that are overlapped by the bounding box; and a code segment for varying an intensity of the overlapped pixels according to the amount of overlap.

The code segment that determines pixels in a neighborhood of the current pixel preferably operates to store overlap-related information, for all of the samples that map onto the current pixel, within an auxiliary array. The code segment that varies the intensity then uses the contents of the auxiliary array to vary the intensity of corresponding pixel locations in a frame buffer that has an output coupled to the display screen.

The code segment that varies the intensity is responsive to a sub-pixel location of the sample, and to a precomputed summed area table (SAT), for determining an amount by which to vary the intensity.

Datapath circuitry that implements the methods of this invention is also disclosed.

BRIEF DESCRIPTION OF THE DRAWINGS

The above set forth and other features of the invention are made more apparent in the ensuing Detailed Description of the Invention when read in conjunction with the attached Drawings, where.

DETAILED DESCRIPTION OF THE INVENTION

Figure 1:
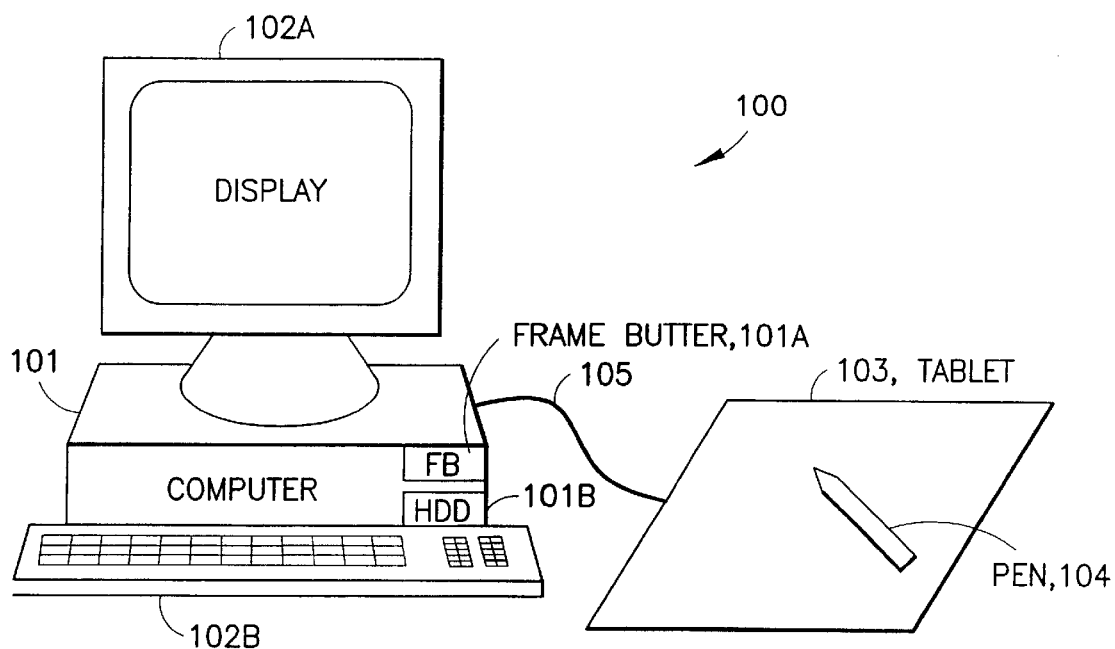
FIG. 1 is simplified block diagram of a computer system that is suitable for practicing this invention.

FIG. 1 illustrates a data processing system 100 that is suitable for practicing this invention. The data processing system 100 includes a computer 101 having a user interface that includes a display 102A and a keyboard 102B. A digitizer tablet 103, having a tethered or an untethered pen 104, is coupled to the computer 101 through a suitable cable 105. A user creates handwriting samples in a conventional manner by moving a tip of the pen 104 across the surface of the tablet 103. The samples are sent to the computer 101 and then mapped to and displayed on the display 102A.

Figure 3:
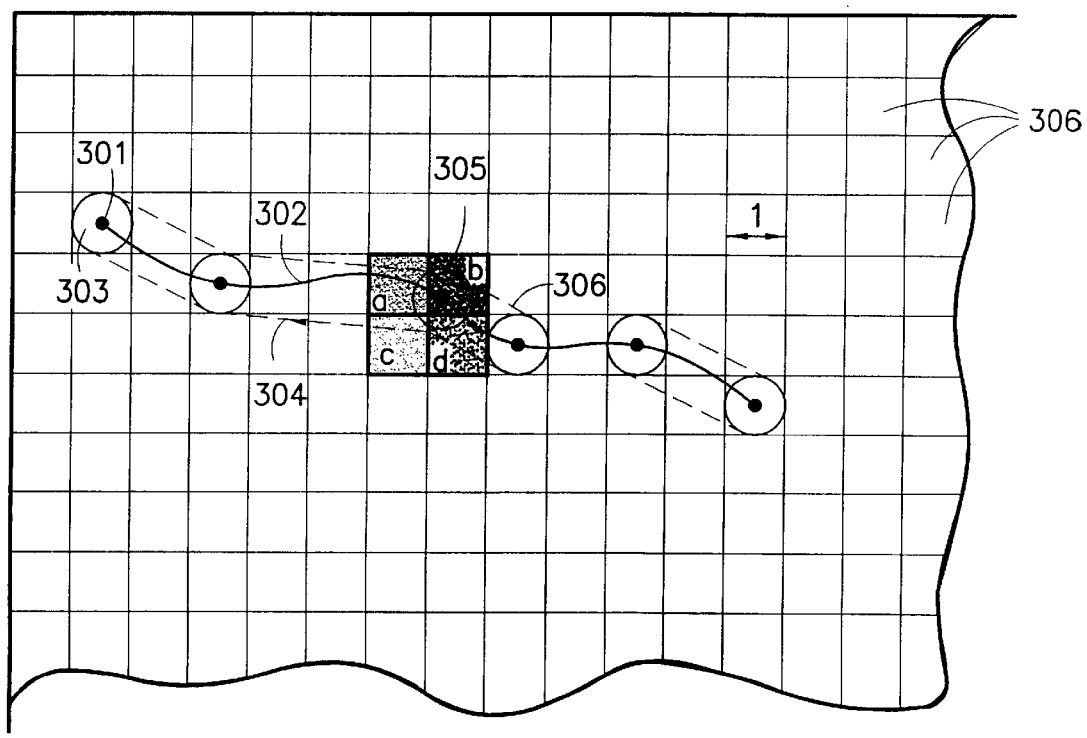
FIG. 3 shows a technique for generating a line connecting samples.

Ink is often rendered by simply connecting the samples with straight line segments, or by using higher order curves, as was discussed above. A most-straight-forward technique is to use standard, single pixel wide lines, which can be drawn rapidly on most computer systems, but which lack visual quality. More particularly, such lines are not anti-aliased, i.e., they exhibit "staircases", also known in the art as "jaggies". Aliasing effects are a well known problem in signal theory and computer graphics and stem primarily from insufficient sampling of a signal. The undesirable aliasing effects can be alleviated by reducing the frequency content of a signal. When applied to line drawing, aliasing occurs because simple line drawings do not set all pixels that are affected by a line. This is illustrated in FIG. 3.

A stroke is defined by samples 301. In FIG. 3, an ideal, zero-width stroke is shown by the curve 302. To render the stroke as a one pixel 306 wide curve, the stroke is represented by a disk 303 with a diameter of 1. Sweeping the center of the disk 303 along the ideal curve 302 generates a 1-pixel wide representation of the stroke. The area covered by such a sweep is indicated by the dashed line 304. In general, for every position of the disk along the path of the stroke several pixels 306 are overlapped by the disk 303. For example, at position 305 the disk 303 affects the pixels 306a, 306b, 306c and 306d.

By modulating the intensity of the overlapped pixels 306 according to the area covered by the amount of overlap with the disk 303, a smoother appearance of the curve is created.

The exact method of determining the overlap areas between the disk 303 and the pixels 306, as well as the mapping of the overlap area to intensity, is captured in a filter function that is described in detail below.

The temporal and spatial resolution of the sampling process varies between different makes of digitizers, but their spatial resolution typically exceeds that of most displays (both CRT-based and LCD-based displays). For example, if the digitizer tablet 130 can generate 150 samples per second, and if the average pen speed is one inch per second, the digitizer tablet 103 will generate 150 samples per inch (spi), while typical CRTs and LCDs have spatial resolutions of only 100 pixels per inch (ppi). As such, it can be appreciated that several digitizer tablet 103 samples will typically map to one display screen pixel. Similarly, for faster movements of the pen 104 the samples may be spaced further apart than the pixel spacing of the display 102A.

Figure 2:
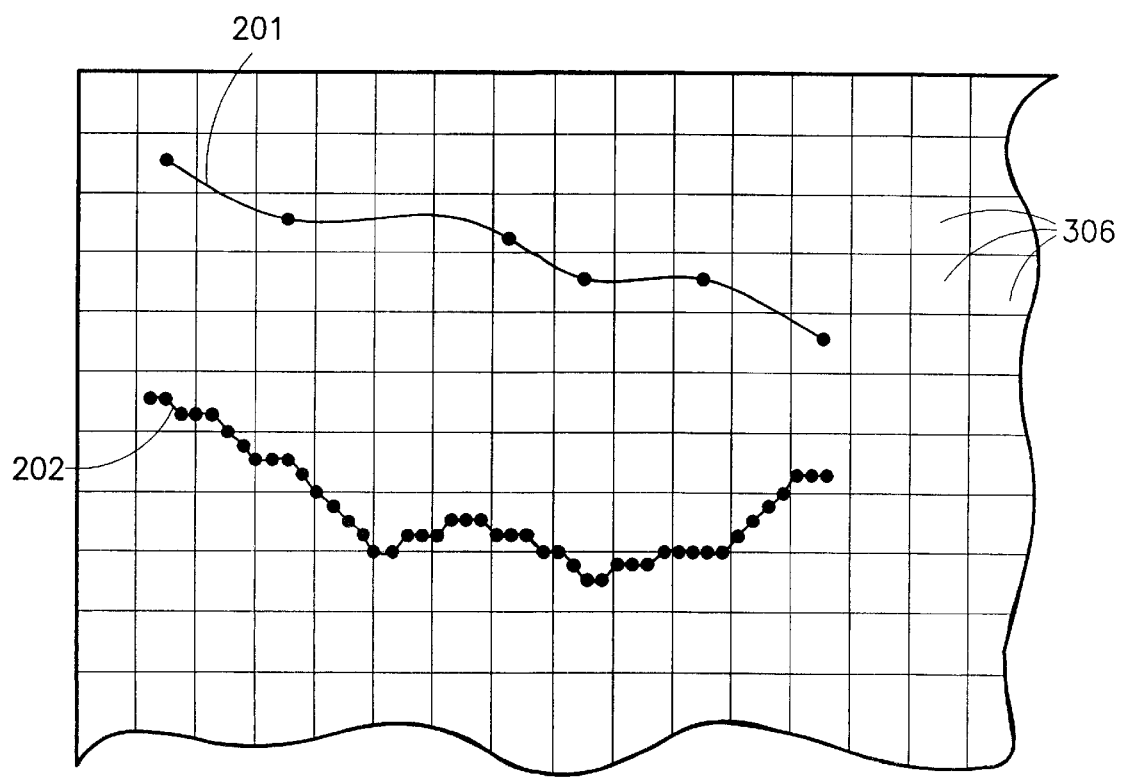
FIG. 2 shows an exemplary mapping of digitizer samples for a fast stroke and for a slow stroke.

FIG. 2 shows the mapping of digitizer samples for a fast stroke 201 and for a slow stroke 202. Stroke 201 was drawn with a pen velocity that results in adjacent samples being spaced from one to several pixels apart, while stroke 202 was drawn with a lesser velocity so that adjacent samples are closer together such that multiple samples map to the same pixel 306. Note should be made that the zoom factor also affects how many samples will map to a given pixel 306. That is, enlarging the ink stroke on the display 102A moves the samples further apart, while reducing the size of the ink stroke on the display 102A causes the samples to move closer together.

Rendering strokes where temporally adjacent samples map into different pixels 306 can be easily accomplished by connecting the appropriate pixels by n-pixel wide, anti-aliased lines. Algorithms to draw such lines are well known in the art. The teachings of this invention are concerned more particularly with a method to create anti-aliased electronic ink images for samples that map onto the same pixel 306.

The overall process for rendering samples for an n-pixel wide ink stroke, is described by the following pseudo-code: Pseudo-Code 1

1. L=1+2*ceil(n/2)
2. For all ink strokes I
3. For all Sample S in I
4. P is the pixel to which S maps
5. For all pixels Q forming an L×L neighborhood of P
6. Add to Q the contribution of S
7. If *(value(Q)>1.0) value(Q): =1.0

In Step 1, ceil ( ) represents a ceiling function[ ] wherein a decimal value is rounded up to the next integer (e.g., 3.17 is rounded up to 4, 2.89 is rounded up to 3, etc.). Strokes and the samples forming each stroke are processed sequentially in Steps 2 and 3. In Step 4, for each sample the method computes the pixel that the sample maps to. Step 5 determines how much each sample overlaps pixels surrounding the current pixel, and in Step 6 the method adds those contributions to the pixels in the neighborhood. As all pixel values for this embodiment are assumed to be between 0.0 and 1.0, Step 7 clamps the pixel values to 1.0.

Figure 4:
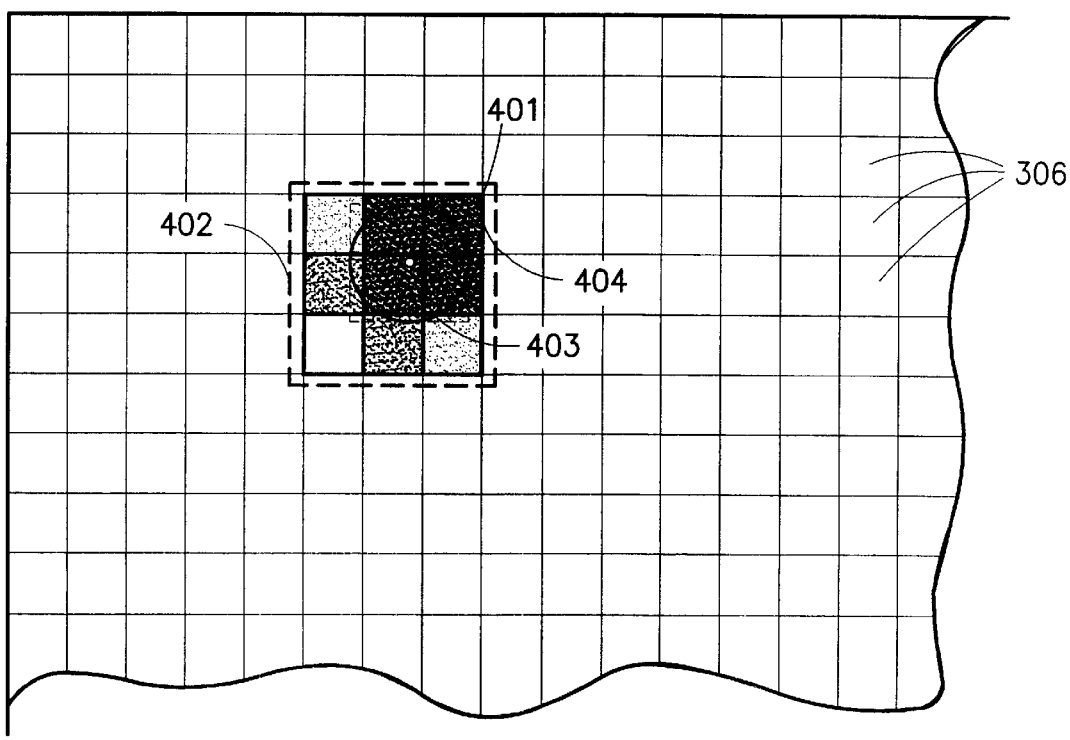
FIG. 4 shows a line rendering process for a sample that is represented by a 2-pixel wide disk, where a neighborhood around the sample is depicted as a dashed box, and where the circle indicates an extent to which a sample affects pixels within the neighborhood.

FIG. 4 shows this process for a sample that is represented by the 2-pixel wide disk, and the neighborhood around sample 401 is depicted as the dashed box 402. The circle 403 indicates the extent to which the sample 401 affects pixels 306 in the neighborhood.

The procedure shown above in Pseudo-Code 1, although functionally correct, is inefficient since it performs frequent write operations to the same pixels. In particular, for slow strokes that map multiple samples to the same pixel 306, the same neighborhood pixels Q are accessed multiple times. In order to alleviate this inefficiency, it is preferred to employ an auxiliary array A to store and accumulate the contributions of all samples that map into the same pixel. Only when the stroke samples leave the current pixel are the values that have accumulated in A added to the values stored in the actual pixels, i.e., to the corresponding pixel memory locations in a display frame buffer (FB) 101A. This improved procedure is shown in the following Pseudo-Code 2:
Pseudo-Code 2

1. L:=1+2*ceil(n/2) //Maximum pixel range an n-pixel point can affect
2. Allocate and clear an L×L array A
3. For all ink strokes I
4. R is the pixel to which the first sample of I maps
5. For all samples S in I
6. P is the pixel to which S maps
7. If (S is the first sample in I) R:=P
8. If (R!=P) //current+previous samples are in different pixels
9. Add all contributions in A to the screen pixels
10. If (value(pixel)>1.0) value(pixel): =1.0
11. Clear A
12. For all pixels Q forming an L×L neighborhood of P
13. Add to Q the contribution of S
14. If (value(Q)>1.0) value(Q):=1.0
15. If (R==P) Add all contributions in A to the screen pixels The size L×L of the neighborhood array A is chosen such that a circle with a diameter of the chosen line width (1) located anywhere in the center pixel will always be fully contained in an L×L square array of pixels 306. FIG. 4 illustrates this concept for the sample 401 displayed as the circle 403 of radius 1. The neighborhood A is computed from the bounding box 404 around the circle, and is shown by the dashed box 402 that defines a square region.

In general, L is computed as $1+2*\lceil 1/2 \rceil$. The following Table illustrates how the value of L varies as a function of the value of 1.

TABLE

| Line width 1 | Extent of neighborhood (L × L) |
|---|---|
| 1.0 | 3 × 3 |
| 1.5 | 3 × 3 |
| 2.0 | 3 × 3 |
| 2.5 | 5 × 5 |
| 3.0 | 5 × 5 |

A description is now provided of a technique to compute the contributions that a sample has on its neighborhood (Step 13 in Pseudo-Code 2). The contributions are computed in two steps: (A) compute the overlap of the sample with neighboring pixels to determine an overlap factor; and (B) determine a contribution based on the overlap factor.

To determine the actual contribution, the pixel is subdivided into an m×m array of sub-pixels, and samples are mapped to sub-pixel centers. Next, a box of size l×l, centered on the sample, is computed. This is the box 404 in FIG. 4. Based on the size and position of the box 404, the procedure next determines those pixels in the neighborhood A that are overlapped by the box 404. The Pseudo-Code shown in Appendix A describes one presently preferred method to compute the overlap. The disclosure found in Appendix A is incorporated by reference herein in its entirety.

In general, the algorithm is structured in two stages. In a first stage, a preprocessing step, a summed area table (SAT) is computed. In a second step the SAT is addressed as a lookup table and is used to retrieve the contributions that a digitizer 103 sample makes to a given pixel 306.

SATs are well known data structures in computer graphics. For example, reference can be had to a publication: Franklin C. Crow, "Summed-area Tables for Texture Mapping", Computer Graphics (Proceedings of SIGGRAPH 84), 18(3), pp. 207–212, July 1984, Minneapolis, Minn., edited by Hank Christiansen. In general, SATs form a two-dimensional table that contains the value of two-dimensional integrals (summed areas) at given sample locations.

The algorithm shown in Appendix A first precomputes the value of a filter function for a given coverage of a pixel by a digitizer sample.

The overall procedure found in Appendix A is controlled by the routine displayStrokes ( ), which begins at line 299. This routine displays a set of samples from the digitizer tablet 103 that form a stroke.

Note should be made of the fact that no code is provided to connect samples that fall into separate pixels, as it is assumed that a conventional line drawing routine for anti-aliased lines can be used for this purpose.

As described above, a temporary neighborhood array nh☐ is used to accumulate the contributions from adjacent samples that fall within the same pixel. Once completed, the neighborhood array nh☐ is written to the screen by blending the contributions stored in nh☐ with the pixel values stored in the frame buffer 101A.

The routine addToNeighborhood ( ), which begins at line 234, computes the actual contributions added to nh☐. Based on the sub-pixel location of the sample, for all pixels potentially overlapped by the sample, the sample's contributions are looked up in the precomputed SAT. The accumulated weight is clamped to 1.0.

Although described above in the context of black (monochromatic) ink strokes, these teachings can be readily extended to anti-aliasing colored strokes. In this case the contributions for each color component, e.g., red, green and blue, are accumulated, as opposed to only gray values.

Also in this case, the clamping function may operate so as to clamp the maximum color intensity value to whatever is the desired maximum value. For example, for 8-bit color values the maximum value for each color component is 255, although the maximum value for the clamping function could be set to less than 255.

To increase the visual quality of the anti-aliased strokes even further, the final pixel color written into the frame buffer 101A (and from the frame buffer 101A to the screen of the display 102A) can be further processed to apply a gamma correction in order to take into account any display screen non-linearities. Various techniques and circuits for applying gamma correction values are well known in the art.

The methods disclosed above are preferably embodied as program code on a medium that is readable by the computer 101, such as a hard disk drive (HDD) 101B. The program code is used to direct the operation of the computer 101 to render lines corresponding to samples from the digitizer tablet 103 that map onto the same pixel 306 of the display screen 102A.

Figure 5:
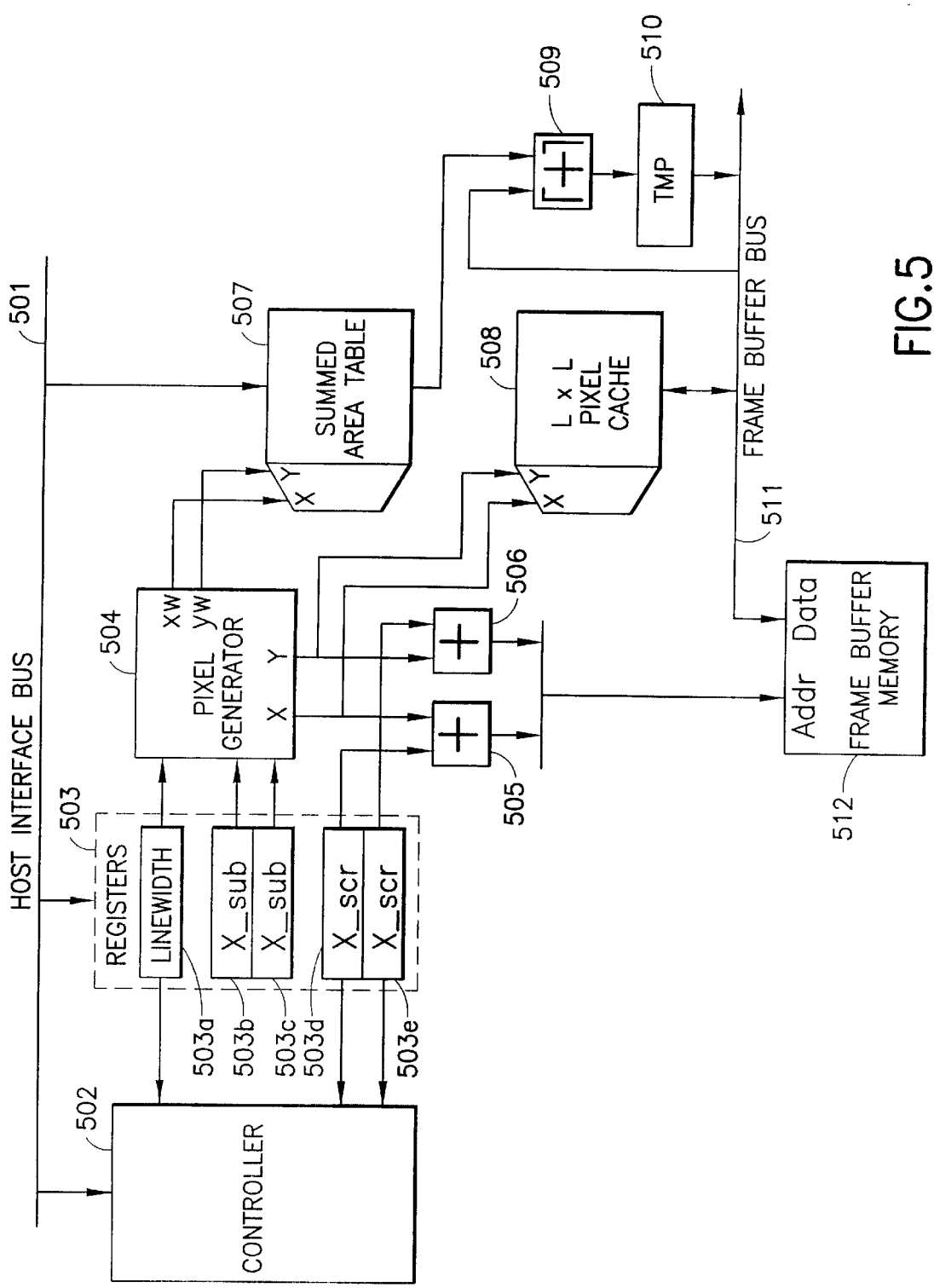
FIG. 5 is a block diagram of datapath circuitry operable for processing the digitizer sample data in accordance with these teachings.

FIG. 5 illustrates a block diagram of circuitry suitable for implementing a datapath embodiment of this invention. The overall datapath is controlled by a controller 502. Controller 502 implements the control flow outlined in the routine displayStrokes ( ) in lines 299–377, and in the routine addToNeighborhood ( ) in lines 234–294 of the algorithm found in Appendix A. More particularly, the functions performed by the controller 502 include the following:

(A) The controller 502 maintains communication with a host processor (such as the computer 101 of FIG. 1) over a Host Interface Bus 501, and controls storing parameters into the Registers 503 and into the Summed Area Table (SAT) 507. The controller 502 may be installed within the host processor, or it may be a separate unit.

(B) The controller 502 determines whether a new sample received from the Host Interface Bus 501 falls into the same pixel as the previous sample (line 350), and conditionally initiates a write-back of the information stored in a Pixel Cache 508 (lines 353–362).

(C) The controller 502, for every new pixel, issues instructions to a Pixel Generator 504 to iterate over all pixels in the L×L neighborhood around the sample (lines 247–282).

(D) The controller 502 selects the input source for the Pixel Cache 508 to be either a Frame Buffer Bus 511 or a Temporary (Tmp) Register 510. It also selects whether the Pixel Cache 508 reads or writes data on the Frame Buffer Bus 511.

(E) The controller 502 applies control signals to a Frame Buffer Memory 512 (shown generally in FIG. 1 as FB 101A) to read or write data on the Frame Buffer Bus 511.

The various control lines that emanate from the controller 502, as well as various status lines that terminate at the controller 502, are not shown in FIG. 5 in order to simplify the drawing and to emphasize the major signal flow paths.

The five Registers 503a–503e store the line width with which the strokes are to be displayed (Linewidth 503a), as well as the X-Y coordinates of the current sample. The integer portion of the sample coordinates is stored in the registers X_scr 503d and Y_scr 503e, while the fractional portion of the sample coordinates is stored in the registers X_sub 503a and Y_sub 503b.

The Pixel Generator 504 generates relative coordinates around the sample to describe all of the pixels in the L×L neighborhood. The two Adders 505 and 506 combine the current sample coordinates and the relative coordinates to compute the actual screen pixel coordinates of all pixels in the pixel neighborhood. The Pixel Generator 504 also generates coverage coordinates xw and yw (lines 277 and 282) based on the pixel and sub-pixel coordinates of the sample. The coordinates are used to address the SAT 507.

The SAT 507 stores the precomputed filter function. The actual values of the filter function may be computed on the host processor, as shown in Appendix A, and downloaded over the Host Interface Bus 501 to the SAT 507. The output of the SAT 507 is added to a pixel in the neighborhood around the current sample using a Clamping Adder 509. The result is stored in the Temporary Register 510 and is eventually written back into the Pixel Cache 508.

The Pixel Cache 508, which is addressed by the Pixel Generator 504, stores the values of the pixels in a neighborhood around the sample. The maximum size of the neighborhood is determined by the size of the storage provided by the Pixel Cache 508, and a particular implementation will set this to be Lmax×Lmax.

While the invention has been particularly shown and described with respect to preferred embodiments thereof, it will be understood by those skilled in the art that changes in form and details may be made therein without departing from the scope and spirit of the invention.

APPENDIX A

```
16.   //////////////////////////////////////////////////////////
17.   //////////////////////////////////////////////////////////
18.   //
19.   //            COPYRIGHT 2000 International Business Machines Corporation
20.   //   Compute the overlap of the current point centered on 'subpixel' with the
21.   //   neighboring pixels.
22.   //
23.   //   The situation looks basically as follows for a 3×3 pixel neighborhood
24.   //   (linewidth == 1).
25.   //
26.   //   * * * * : pixel boundary
27.   //   . . . . : extent of the sample point
28.   //
29.   //
30.   //       *             *             *             *
31.   //    ***********************************************
32.   //    *    top-left   *    top      *   top-right   *
33.   //    *               *             *               *
34.   //    *               *             *               *
35.   //    *               *             *               *
36.   //    *               *             *               *
37.   //    *        .................    *               *
38.   //    *        :      *         :   *               *
39.   //    *        :      *         :   *               *
40.   //    ***********:***********************************
41.   //    *        :      *        :↑   *               *
42.   //    *        :   O (xs,ys)   :|   *               *
43.   //    *        :      *        :| yw *               *
44.   //    *        :      *        :|   *               *
45.   //    *        :      *    xw  :↓   *               *
46.   //    *        :      *  ←---→ :    *               *
47.   //    *        :................    *               *
48.   //    *               *             *               *
49.   //    *               *             *               *
50.   //    *               *             *               *
51.   //    *     left      *   center    *    right      *
52.   //    ***********************************************
53.   //    *               *             *               *
54.   //    *               *             *               *
55.   //    *               *             *               *
56.   //    *               *             *               *
57.   //    *               *             *               *
58.   //    *               *             *               *
59.   //    *               *             *               *
60.   //    *  bottom-left  *   bottom    *  bottom-right *
61.   //    ***********************************************
      //       *             *             *             *
62.   //
63.   //
64.   //   The sample contributes to up to 4 pixels in the 3×3 neighborhood.
65.   //   The contributions are measured in percentages 'xw and 'yw for each
66.   //   of those 4 pixels.
67.   //
68.   //   Given those percentages, we look up in a summed-area-table (SAT)
69.   //   the actual contributions the sample makes to the pixel.
70.   //
71.   //   SATs are well known technique from texture mapping (Crow et al.)
72.   //   that store in a 2-dimensional array in every (i,j) the sum of
73.   //   all the function values f(x,y) for 0<=x<=i, 0<=y<=j. By precalculating
74.   //   the SAT for a given subpixel resolution, we avoid having to
75.   //   integrate over the 2D filter function at every pixel.
76.   //
77.
78.   //////////////////////////////////////////////////////////
79.   //
80.   //   Summed area table routines
81.   //
82.   //
83.   //   Precompute the volume under the filter function for intervals 0 < x < 1
```

APPENDIX A-continued

```
84.   //     We make no attempt to scale the weights such that they add up to 1.0.
85.   //     This is taken care of by the calling routine.
86.   //
87.
88.   //
89.   //     Calculate the value of the filter function for a given subpixel coordinate (x,y).
90.   //     The origin of the pixel is assumed to be at a corner, while the filter function
91.   //     is centered around (0.5, 0.5), i.e. the pixel center.
92.   //
93.   static float calcWeight (int x, int y, int res)
94.   {
95.       float step = 1.0 / (float)res ;
96.       float fx = (x+0.5)*step − 0.5 ;
97.       float fy = (y+0.5)*step − 0.5 ;
98.       float weight ;
99.
100.          switch (use_filter)
101.          {   case CONE:
102.                  {   // This filter implements a cone filter of radius 1.0
103.                      float radius = sqrt(fx*fx + fy*fy) ;
104.                      weight = 1.0 − radius ;
105.                  }
106.                  break ;
107.
108.              case BOX:
109.                  {   // This filter implements a BOX filter
110.                      // We scale all values such that the total of all samples equals 1.0
111.                      weight = 1 ;
112.                  }
113.                  break ;
114.          }
115.
116.          return (weight) ;
117.      }
118.
119.
120.      //
121.      //     Build the actual SAT by filling in elements based on filter function values
122.      //     Start at bottom-left corner of the SAT and then work outwards towards to the
123.      //     top-right corner.
124.      //
125.      static void createSAT (int res)
126.      {
127.          int i, j ;
128.          float *s, max ;
129.
130.          if (res == sat.res) return ;
131.
132.          if ((sat.sum = (float *) realloc (sat.sum. res*res*sizeof(float))) == NULL)
133.          {   fprintf (stderr, *Could not reallocate 'sat.sum'. \n") ;
134.              exit (21) ;
135.          }
136.          sat.res = res ;
137.          sat.step = 1.0 / res ;
138.
139.          // First calculate the lowest row and left-most column of the SAT
140.          s = sat.sum ;
141.          *s = calcWeight (0,0, res) ;
142.
143.          s = sat.sum + 1 ;
144.          for (i=1 ; i<res; i++)
145.          {   float w = calcWeight (i, 0, res) ;
146.              *s = w + *(s−1) ;
147.              s++ ;
148.          }
149.
150.          s = sat.sum + res ;
151.          for (j=1 ; j<res ; j++)
152.          {   float w = calcWeight (0, j, res) ;
153.              *s = w + *(s-res) ;
154.              s += res ;
155.          }
156.
157.          // Now compute all the interior elements of the SAT
158.          s = sat.sum + res+1 ;
159.          for (j=1 ; i<res ; i++)
160.          {   for (i=1 ; i<res ; i++)
161.              {   float w = calcWeight (i, j, res) ;
```

APPENDIX A-continued

```
162.                    *s = w + *(s−1) + *(s-res) − *(s-res-1) ;
163.                    s++ ;
164.                }
165.                s++ ;
166.            }
167.
168.            // Normalize all SAT elements such that the top-right element is 1.0
169.            s = sat.sum ;
170.            max = *(s + res*res-1) ;
171.            for (i=0 ; i<res*res ; i++, s++)
172.                *s = *s / max ;
173.
174.            return ;
175.        }
176.
177.
178.        //
179.        //    Destroy the current SAT, e.g. because the subpixel resolution or
180.        //    the filter was changed
181.        //
182.        static void deleteSAT (void)
183.        {
184.            sat.res = 0 ;
185.            free (sat.sum) ;
186.
187.            return ;
188.        }
189.
190.
191.        //
192.        //    Return a value from the SAT
193.        //
194.        static float getSAT (float xp, float yp)
195.        {
196.            int res = sat.res ;
197.            float incr = sat.step ;
196.            float ret ;
199.            float *s ;
200.            int x, y ;
201.
202.            if (xp <= incr/2.0) return 0.0 ;
203.            if (yp <= incr/2.0) return 0.0 ;
204.
205.            x = (int) (xp * res) − 0.5 ;
206.            y = (int) (yp * res) − 0.5 ;
207.
208.            if (x > res) x = res ;
209.            if (y > res) y = res ;
210.
211.            s = sat.sum ;
212.            ret = *(s + x + y*res) ;
213.
214.            return ret ;
215.        }
216.
217.
218.        //
219.        //    Compute the contributions a sample at integer subpixel location 'subpixel'
220.        //    makes to the pixels around it. Add these contributions to 'nh'.
221.        //
222.        //    The subpixel coordinates are provided as floating point numbers between
223.        //    0.0 and 1.0 with the pixel origin at the top-left corner of the pixel.
224.        //
225.        //    We compute the contribution of the point to the pixel by creating a
226.        //    (linewidth x linewidth) square around the point.
227.        //
228.        //    We keep a flag for every pixel in the neighborhood to indicate whether
229.        //    the pixel has received any contribution. We use this flag later to determine
230.        //    whether to blend this contribution with the existing pixel value.
231.        //    Read-Modify-Write on pixels is kinda expensive. Therefore, we attempt to
232.        //    keep these operations to a minimum.
233.        //
234.        static void addToNeighborhood (Tfrac subpixel, Tneighborhood *nh)
235.        {
236.            // Subpixel coordinates
237.            float xs = subpixel[X] ;
238.            float ys = subpixel[Y] ;
239.
240.    static in first_time = 1 ;
```

APPENDIX A-continued

```
241.        if (first_time)
242.        {   first_time = 0 ;
243.            createSAT (16) ;
244.        }
245.
246.
247.        {   float half_1w = 0.5 * use_linewidth ;
248.            int 1w2 = ceil(half_1w) ;
249.            int x, y ;
250.
251.            // Overlapped area of the center pixel (the target pixel itself)
252.            // Note that all pixels are fully covered except those around the
253.            // border of the point. Therefore, we only evaluate the coverage
254.            // function (filter) for those pixels, all other pixels are assigned
255.            // full intensity by default.
256.
257.            //
258.            // First compute the neighboring pixels that are actually affected
259.            // by the point. The point covers all pixels that fall within the range
260.            // (+/- 0.5 x linewidth) both in x and y.
261.            // These pixels are identified relative to the center pixel,
262.            // which has relative coordinates (x, y) = (0, 0).
263.            //
264.            // We then compute the actual percentage xw, yw that a given pixel
265.            // is overlapped by the point. Those percentages are then used to
266.            // look up the value filter function defined over each pixel. This
267.            // will give the actual contribution of the point to the pixel.
268.            //
269.            int xstart = floor(xs - half_1w) ;
270.            int xend = floor(xs + half_1w) ;
271.            int ystart = floor(ys - half_1w) ;
272.            int yend = floor(ys + half_1w) ;
273.
274.            for (x=xstart ; x <= xend ; x++)
275.            {   float x1 = xs - half_1w - x ;        // left
276.                float xr = x1 + use_linewidth ;      // right
277.                float xw = (x==xstart) ? 1.0-x1 :    ((x==xend) ? xr : 1.0) ;
278.
279.                for (y=ystart ; y <= yend ; y++)
280.                {   float yt = ys - half_1w - y ;        // top
281.                    float yb = yt + use_linewidth ;      // bottom
282.                    float yw = (y==ystart ? 1.0-yt : ((y==yend) ? yb : 1.0) ;
283.
284.                    float weight = getSAT (xw, yw) ;
285.                    if (weight > 0.0)
286.                    {   nh->f[x+1w2][y+1w2] = 1 ;
287.                        nh->p[x+1w2][y+1w2] += weight ;
288.                    }
289.                } // for y
290.            } // for x
291.        }
292.
293.        return ;
294.    }
295.
296.
297.    //////////////////////////////////////////////////////////////
298.    //////////////////////////////////////////////////////////////
299.    static void displayStrokes (Tstroke_set *ss)
300.    {
301.        int i, j ;
302.        Tstroke *s ;
303.        Tcoord Scurr ;        // Pixel coordinates of point currently considered
304.        Tcoord Snext ;        // Pixel coordinates of the next point on the stroke
305.        Tfrac Ssub ;          // Subpixel coordinates of the point along the stroke
306.
307.                             // Pixel neighborhood around the current pixel
308.        static Tneighborhood nh = (0, NULL, NULL) ;
309.
310.        // Allocate storage for storing the neighborhood around a pixel
311.        createNeighborhood (&nh, use_linewidth) ;
312.
313.        for (i=0 ; i < ss->n ; i++)
314.        {
315.            s = ss->stroke + i ;
316.
317.            switch (use_aa)
318.            {
319.            case 0: // No anti-aliasing
```

APPENDIX A-continued

```
320.
321.                    for (j=0 ; j < s->n ; j++)
322.                    {
323.                        GET_PIXEL (Scurr, s->Pc[j]) ;
324.                        Scurr[X] -= 0.25 * use_linewidth ;
325.                        Scurr[Y] -= 0.25 * use_linewidth ;
326.                        drawpixel (Scurr, use_linewidth, 1.0) ;
327.                    } // for j (points in the stroke)
328.                    break ;
329.
330.        case 1:     // Anti-aliased drawing of strokes
331.                    //
332.                    // The algorithm computes the point's contributions to
333.                    // a neighborhood of pixels. These contributioins are
334.                    // added to the current values of those pixels.
335.                    //
336.                    // The contributions are stored in 'nh', which captures
337.                    // all the points falling inside a given pixel.
338.                    // When the stroke leaves this pixel, 'nh' is written
339.                    // to the screen.
340.                    //
341.
342.                    RESET_NEIGHBORHOOD (nh) ;
343.                    GET_PIXEL_SUBPIXEL (Scurr, Ssub. s->Pc[0]) ;
344.                    addToNeighborhood (Ssub, &nh) ;
345.
346.                    for (j=1 ; j < s->n ; j++)
347.                    {
348.                        GET_PIXEL_SUBPIXEL (Snext, Ssub. s->Pc[j]) ;
349.
350.                        if ((Snext[X] == Scurr[X]) && (Snext[Y] == Scurr[Y]))
351.                        {       // Still same pixel
352.                        }
353.                        else
354.                        {   // Hit a new pixel:
355.                            // Draw the old pixel . . .
356.                            drawNeighborhood (Scurr, &nh) ;
357.
352.                            // . . . and advance to the next pixel
359.                            Scurr[X] = Snext[X] ;
360.                            Scurr[Y] = Snext[Y] ;
361.                            RESET_NEIGHBORHOOD (nh) ;
362.                        }
363.
364.                        addToNeighborhood (Ssub, &nh) ;
365.                    }   // for j (points in the stroke)
366.
367.                    // Draw the final pixel
368.                    drawNeighborhood (Scurr, &nh) ;
369.                    break ;
370.
371.            } // switch (aa)
372.        } // for i (all strokes)
373.
374.        freeNeighborhood (&nh) ;
375.
376.        return ;
377.    }
```

What is claimed is:

1. A method for creating anti-aliased line images for digitizer tablet samples that map onto a same display screen pixel, comprising steps of:

for each sample that maps onto the same display screen pixel, determining a contribution of the sample to other pixels according to an amount that the sample overlaps other pixels that form a neighborhood of the same display screen pixel; and adding the contribution to the pixels that form the neighborhood.

2. A method as in claim 1, wherein the step of determining includes a step of storing the contributions in an auxiliary array, and wherein the step of adding adds the contents of the auxiliary array to pixel locations in a frame buffer.

3. A method as in claim 1, wherein a size of the neighborhood is a function of a desired line thickness.

4. A method for creating anti-aliased line images for digitizer tablet samples that map onto a same display screen pixel, comprising steps of:

subdividing a display screen pixel into a plurality of sub-pixels;

for each sample that maps onto the same display screen pixel, mapping the sample onto a sub-pixel center;

computing a bounding box that is centered on the sample;

based on the size and position of the bounding box, determining those pixels in a neighborhood of the same display screen pixel that are overlapped by the bounding box; and varying an intensity of the overlapped pixels according to the amount of overlap.

5. A method as in claim 4, wherein the step of determining includes a step of storing overlap-related information, for all of the samples that map onto the same display screen pixel, within an auxiliary array, and wherein the step of varying uses the contents of the auxiliary array to vary the intensity of corresponding pixel locations in a frame buffer.

6. A method as in claim 4, wherein a size of the neighborhood is a function of a desired line thickness.

7. A procedure embodied as program code on a medium that is readable by a computer, the program code being used to direct operation of the computer to render lines corresponding to samples, from a digitizer tablet, that map onto a same pixel of a display screen, comprising:

a code segment for subdividing a display screen pixel into a plurality of sub-pixels;

a code segment, responsive to each sample that maps onto a same display screen pixel, for mapping the sample onto a sub-pixel center;

a code segment for computing a bounding box that is centered on the sample;

a code segment, responsive to a size and position of the bounding box, for determining those pixels in a neighborhood of the same display screen pixel that are overlapped by the bounding box; and a code segment for varying an intensity of the overlapped pixels according to the amount of overlap.

8. A procedure as in claim 7, wherein the code segment that determines pixels in a neighborhood of the same display screen pixel operates to store overlap-related information, for all of the samples that map onto the same display screen pixel, within an auxiliary array, and wherein the code segment that varies the intensity uses the contents of the auxiliary array to vary the intensity of corresponding pixel locations in a frame buffer that has an output coupled to the display screen.

9. A procedure as in claim 7, wherein the code segment that varies the intensity is responsive to a sub-pixel location of the sample, and to a precomputed summed area table (SAT), for determining an amount by which to vary the intensity, wherein determining the amount includes clamping a value of the amount to a predetermined maximum value.

10. A procedure as in claim 7, wherein a size of the neighborhood is a function of a desired line thickness.

11. Apparatus for creating anti-aliased line images for digitizer tablet stroke samples, comprising a controller, operable for each sample that maps onto a same display screen pixel, for controlling operation of a datapath for determining a contribution of the sample to other pixels according to an amount that the sample overlaps other pixels that form a neighborhood of pixel being considered, and further controlling adding the contribution to the pixels that form the neighborhood, the storage of the contributions into an auxiliary array, and the addition of the contents of the auxiliary array to pixel locations in a frame buffer.

12. Apparatus as in claim 11, wherein a size of the neighborhood is a function of a stored value defining a desired line thickness.

13. Apparatus as in claim 11, where said datapath comprises a plurality of registers for storing a linewidth with which a stroke is to be displayed, an integer portion of the current sample coordinates and a fractional portion of the current sample coordinates.

14. Apparatus as in claim 13, where said datapath further comprises a pixel address generator, responsive to the linewidth and to the fractional portion of the current sample coordinates, for addressing a lookup table that stores a precomputed filter function for determining, for all pixels potentially overlapped by the current sample, the current sample's contribution to those pixels.

* * * * *